United States Patent
Koganehira

(10) Patent No.: US 10,208,221 B2
(45) Date of Patent: *Feb. 19, 2019

(54) INK COMPOSITION AND INK JET RECORDING METHOD

(71) Applicant: Seiko Epson Corporation, Tokyo (JP)

(72) Inventor: Shuichi Koganehira, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,569

(22) Filed: Aug. 18, 2017

(65) Prior Publication Data

US 2017/0342289 A1 Nov. 30, 2017

Related U.S. Application Data

(63) Continuation of application No. 15/213,566, filed on Jul. 19, 2016, now Pat. No. 9,765,230.

(30) Foreign Application Priority Data

Sep. 29, 2015 (JP) .................................. 2015-190743

(51) Int. Cl.
| | |
|---|---|
| *C09D 11/38* | (2014.01) |
| *C09D 11/033* | (2014.01) |
| *C09D 11/102* | (2014.01) |
| *B41M 5/00* | (2006.01) |
| *B41J 11/00* | (2006.01) |
| *C09D 11/10* | (2014.01) |
| *C09D 11/322* | (2014.01) |
| *B41M 7/00* | (2006.01) |

(52) U.S. Cl.
CPC ........... *C09D 11/38* (2013.01); *B41J 11/0015* (2013.01); *B41M 5/0023* (2013.01); *B41M 7/009* (2013.01); *C09D 11/033* (2013.01); *C09D 11/10* (2013.01); *C09D 11/102* (2013.01); *C09D 11/322* (2013.01)

(58) Field of Classification Search
CPC ...................................................... C09D 11/38
See application file for complete search history.

(56) References Cited

U.S. PATENT DOCUMENTS

| | | | | |
|---|---|---|---|---|
| 5,830,264 | A | * 11/1998 | Fujioka | .................. C09D 11/30 106/31.43 |
| 6,187,086 | B1 | 2/2001 | Rehman | |
| 9,039,823 | B2 | 5/2015 | Koganehira et al. | |
| 2002/0109767 | A1 | 8/2002 | Polierer | |
| 2003/0101906 | A1 | 6/2003 | Shen et al. | |
| 2007/0242119 | A1 | 10/2007 | Koganehira et al. | |
| 2009/0202723 | A1* | 8/2009 | Ikoshi | .................... C09D 11/36 427/256 |

(Continued)

FOREIGN PATENT DOCUMENTS

| | | |
|---|---|---|
| JP | 2011-178980 A | 9/2011 |
| JP | 2011-231270 A | 11/2011 |
| JP | 2013-028130 A | 2/2013 |

*Primary Examiner* — Shelby L Fidler
(74) *Attorney, Agent, or Firm* — Harness, Dickey & Pierce, P.L.C.

(57) ABSTRACT

An ink composition contains water, a coloring material, a surfactant, a slightly water-soluble 1,2-alkanediol having a carbon number of 7 to 10 and a melting point in the range of 30° C. to less than 80° C., and a water-soluble symmetrical both-end alkanediol having a melting point of 80° C. or more.

12 Claims, 2 Drawing Sheets

(56) References Cited

U.S. PATENT DOCUMENTS

| | | |
|---|---|---|
| 2010/0321430 A1 | 12/2010 | Koganehira et al. |
| 2011/0192317 A1 | 8/2011 | Koganehira |
| 2013/0029045 A1 | 1/2013 | Koganehira et al. |
| 2013/0201252 A1* | 8/2013 | Namba ................. C09D 11/40 347/21 |
| 2013/0286084 A1 | 10/2013 | Aoyama et al. |
| 2015/0197101 A1 | 7/2015 | Koganechira et al. |

\* cited by examiner

INK COMPOSITION AND INK JET RECORDING METHOD

CROSS-REFERENCE TO RELATED APPLICATIONS

This application is a continuation of U.S. patent application Ser. No. 15/213,566, filed Jul. 19, 2016, which claims priority Japanese Patent Application No. 2015-190743, filed Sep. 29, 2015, both of which are expressly incorporated by reference herein in their entireties.

BACKGROUND

1. Technical Field

The present invention relates to an ink composition and an ink jet recording method using the same.

2. Related Art

An ink jet recording method is a technique for recording information by ejecting ink droplets to apply the ink droplets onto a recording medium, such as a paper sheet. The ink jet recording method has been innovatively developed. Accordingly, ink jet recording apparatuses are used for recording on low-absorbent recording media such as book printing paper and non-absorbent recording media such as plastic films. For example, JP-A-2011-178980 discloses an ink composition used for such ink jet recording.

The ink composition of JP-A-2011-178980 contains water, a colorant, a water-soluble symmetrical both-end-type alkanediol, an organosiloxane, a resin, a poor water-soluble alkanediol, a crystalline sugar alcohol that is solid at 20° C., and a polyalkylene glycol. This ink composition can form high-quality images on a low-absorbent recording medium such as book printing paper.

An ink composition used for recording on low-absorbent or non-absorbent recording media forms images by being deposited on a recording medium without penetrating the recording medium. Accordingly, such an ink composition is required to have low tackiness (being dry and not tacky or sticky), high fixability, and high water fastness. If a large amount of a highly volatile solvent is added to an ink composition so that the ink composition can be rapidly dried to reduce the tackiness, however, the odor or toxicity of the volatile solvent is likely to cause the work environment of ink jet recording to deteriorate. It is desirable to achieve a very low tackiness without using a volatile solvent. However there has not been known such an ink composition. For example, the ink composition of the above-cited JP-A-2011-178980 contains large amounts of a solvent having a melting point in the range of 30° C. to less than 80° C. and a solvent having a melting point of less than 30° C. This ink composition cannot dry rapidly on non-absorbent recording media such as plastic films.

SUMMARY

An advantage of some aspects of the invention is that it provides an ink composition that can form images having low tackiness and high fixability and exhibiting high water fastness on low-absorbent or non-absorbent recording media, and an ink jet recording method using the ink composition.

According to an aspect of the invention, there is provided an ink composition containing water, a coloring material, a surfactant, a slightly water-soluble 1,2-alkanediol having a carbon number of 7 to 10 and a melting point in the range of 30° C. to less than 80° C., and a water-soluble symmetrical both-end alkanediol having a melting point of 80° C. or more.

The slightly water-soluble 1,2-alkanediol having a carbon number of 7 to 10 and a melting point in the range of 30° C. to less than 80° C. and the water-soluble symmetrical both-end alkanediol having a melting point of 80° C. or more contribute to forming images having low tackiness at room temperature and high fixability.

Preferably, the weight ratio of the symmetrical both-end alkanediol to the slightly water-soluble 1,2-alkanediol is in the range of 3:1 to 6:1.

The symmetrical both-end alkanediol may be 2,5-dimethyl-2,5-hexanediol, and the content thereof is 3.0% by mass to 18.0% by mass.

The slightly water-soluble 1,2-alkanediol may be selected from the group consisting of 1,2-octanediol, 1,2-hexanediol, 4,4-dimethyl-1,2-pentanediol, 5-methyl-1,2-hexanediol, and 4-methyl-1,2-hexanediol, and the content thereof is 1.0% by mass to 3.0% by mass.

The ink composition may further contain a carboxy group-containing resin having a weight average molecular weight of 20,000 or more, and an oxazoline group-containing resin having a weight average molecular weight in the range of 20,000 to 120,000.

The ratio MA/MB of the amount MA by mole of the oxazoline group in the total mass of the oxazoline-containing resin to the amount MB by mole of the carboxy group in the total mass of the carboxy group-containing resin may be in the range of 10 to 40.

The ink composition may further contain 0.1% by mass to 3.0% by mass of an organic amine.

The ink composition may contain 0.1% by mass to 1.0% by mass of an organosiloxane as the surfactant.

Preferably, the content of solvent having a melting point of less than 30° C. is less than 1%.

According to another aspect of the invention, there is provided an ink jet recording method including applying the above-described ink composition onto a recording medium through a nozzle opening, and heating the recording medium at a temperature lower than the melting point of the symmetrical both-end alkanediol.

The ink composition containing the slightly water-soluble 1,2-alkanediol having a carbon number of 7 to 10 and a melting point in the range of 30° C. to less than 80° C. and the water-soluble symmetrical both-end alkanediol having a melting point of 80° C. or more can form images having low tackiness at room temperature and high fixability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
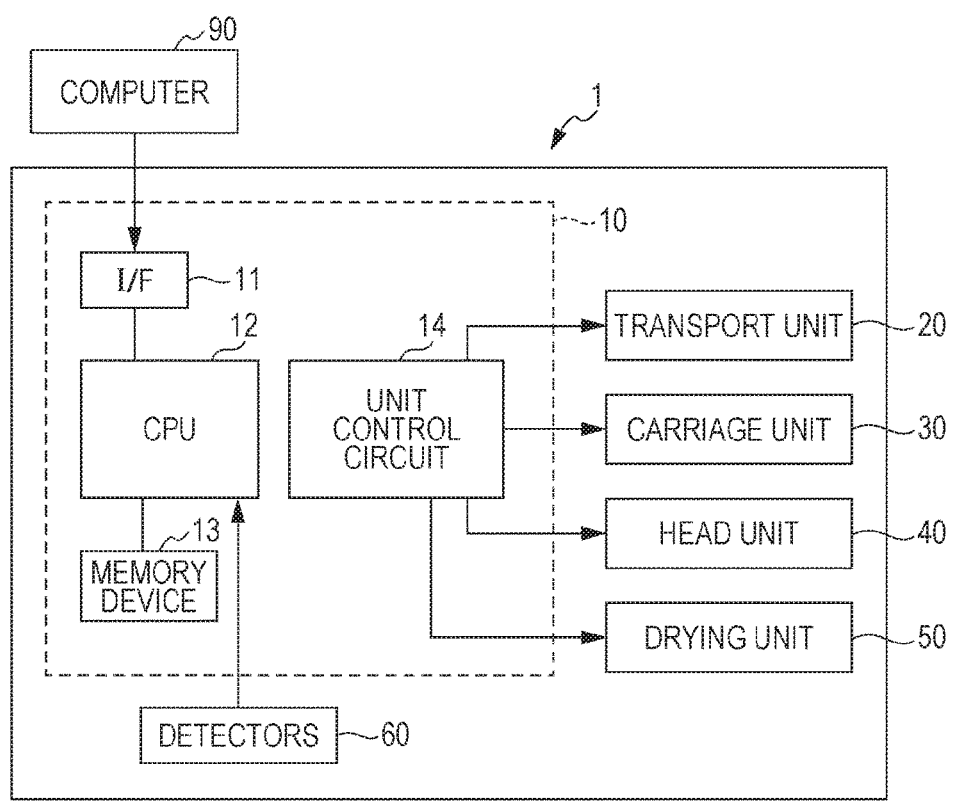
FIG. 1 is a block diagram of a recording system including a recording apparatus used in an embodiment of the invention.

Embodiments of the invention will now be described in detail with reference to the drawings as needed. However, the invention is not limited to the disclosed embodiments, and various modifications may be made without departing from the scope and spirit of the invention. The same elements in the drawings are designated by the same reference numerals, and thus description thereof is omitted. The relative positions and other positional relationship accord with the drawings unless otherwise specified. The dimensional proportions in the drawings are not limited to those shown in the drawings.

The ink composition according to an embodiment of the invention is used for ink jet recording and contains water, a coloring material, a surfactant, a slightly water-soluble 1,2-alkanediol having a carbon number of 7 to 10 and a melting point in the range of 30° C. to less than 80° C., and a water-soluble symmetrical both-end alkanediol having a melting point of 80° C. or more.

In this embodiment, the slightly water-soluble 1,2-alkanediol having a carbon number of 7 to 10 and a melting point in the range of 30° C. to less than 80° C. and the water-soluble symmetrical both-end alkanediol having a melting point of 80° C. or more contribute to forming images having low tackiness at room temperature and high fixability. The constituents of the ink composition will be described in detail below.

Slightly Water-Soluble 1,2-Alkanediol

Examples of the slightly water-soluble 1,2-alkanediol having a carbon number of 7 to 10 and a melting point in the range of 30° C. to less than 80° C. include 1,2-octanediol, 1,2-hexanediol, 4,4-dimethyl-1,2-pentanediol, 5-methyl-1,2-hexanediol, and 4-methyl-1,2-hexanediol. The term "poorly water-soluble" implies that the solubility in water (grams of solute in 100 g of water) is less than 1.0 g. One of the functions of the slightly water-soluble 1,2-alkanediol having a carbon number of 7 to 10 and a melting point in the range of 30° C. to less than 80° C. is to act as a surfactant. Hence, the slightly water-soluble 1,2-alkanediol appropriately reduces the surface tension of the ink composition on an ink-low-absorbent or ink-non-absorbent recording medium, thereby increasing the contact area between the ink droplets and the recording medium. Consequently, the fixability of the ink droplets on the recording medium is increased. Another function is to suppress the flow of the droplets. 1,2-Alkanediols having a carbon number of 7 or more are viscous liquid or solid because of the carbon number. Accordingly, the droplets of the ink composition are less likely to flow after being deposited on the recording medium. Consequently, uneven aggregation of droplets or streaks can be reduced, and the fixability of the ink composition on the recording medium is increased.

Symmetrical Both-End Alkanediol

An example of the water-soluble symmetrical both-end alkanediol having a melting point of 80° C. or more is 2,5-dimethyl-2,5-hexanediol. The melting point of symmetrical both-end alkanediols having a carbon number of 8 or more is assumed to be 80° C. or more. The water-soluble symmetrical both-end alkanediol may be branched. The term "symmetrical both-end alkanediol" mentioned herein refers to an alkanediol that is symmetrical with respect to the plane at the same distance from the hydroxy groups at the ends of the alkanediol. The term "water-soluble" implies that the solubility in water (grams of solute in 100 g of water) is 10.0 g or more at 20° C. The water-soluble symmetrical both-end alkanediol having a melting point of 80° C. or more, which solidifies on the recording medium at room temperature, enables the ink composition to dry rapidly (to have low tackiness) on low-absorbent or non-absorbent recording media and increases the fixability of the ink composition on the such recording media.

In view of ejection stability, it is preferable that the water-soluble symmetrical both-end alkanediol have an ability to enable the slightly water-soluble 1,2-alkanediol to dissolve in water. The above-mentioned 2,5-dimethyl-2,5-hexanediol is superior in enabling the slightly water-soluble 1,2-alkanediol to dissolve in water.

Preferably, the water-soluble symmetrical both-end alkanediol in the ink composition has a higher content than the slightly water-soluble 1,2-alkanediol. Preferably, the weight ratio of the water-soluble symmetrical both-end alkanediol to the slightly water-soluble 1,2-alkanediol is in the range of 3:1 to 6:1. In this range, the slightly water-soluble 1,2-alkanediol can be stably dissolved in the ink composition, and consequently, the ink composition can be stably ejected. If the proportion of the water-soluble symmetrical both-end alkanediol is higher than such a ratio, the storage stability of the ink composition is reduced, and the water fastness is degraded. In contrast, if the proportion of the water-soluble symmetrical both-end alkanediol is lower than the above ratio, the tackiness is increased, and the fixability is reduced. In addition, the slightly water-soluble 1,2-alkanediol cannot be stably dissolved in the ink composition. Consequently, the viscosity is likely to vary with time, and thus the storage stability of the ink composition is not likely to be stably maintained.

The content of the slightly water-soluble 1,2-alkanediol in the ink composition is preferably 1.0% by weight to 3.0% by weight and is more preferably 1.5% by weight to 2.5% by weight. If it is less than 1% by weight, spot-like aggregates may be produced on an ink-low-absorbent recording medium such as book printing paper. In contrast, if it exceeds 3% by weight, the slightly water-soluble 1,2-alkanediol may not completely dissolve in the ink.

The content of the symmetrical both-end alkanediol in the ink composition is preferably 3.0% by weight to 18.0% by weight and is more preferably 6.0% by weight to 9.0% by weight. If it is less than 3.0% by weight, the tackiness is unlikely to be sufficiently reduced, and the fixability is unlikely to be increased. Also, the slightly water-soluble 1,2-alkanediol may not dissolve in the ink composition. In contrast, if it exceeds 18.0% by weight, the ink composition may not be stably stored at low temperatures of 0° C. or less, or the viscosity of the ink composition is likely to increase.

Carboxy Group-Containing Resin and Oxazoline Group-Containing Resin

Preferably, the ink composition further contains a carboxy group-containing resin having a weight average molecular weight of 20,000 or more, and an oxazoline group-containing resin having a weight average molecular weight in the range of 20,000 to 120,000. The carboxy group-containing resin mentioned herein refers to a compound having a carboxy group in the structural skeleton. The oxazoline group-containing resin mentioned herein refers to a compound having an oxazoline group in the structural skeleton.

The oxazoline group-containing resin functions to increase the water fastness of the images formed of the ink composition. The oxazoline group of the oxazoline group-containing resin tends to react with the carboxy group to form a cross-linked structure (amide-ester linkage). By adding a carboxy group-containing resin to the ink composition, therefore, the resulting images can exhibit further improved water fastness.

The oxazoline group-containing resin contains an oxazoline group that can react with the carboxy group-containing resin to form a cross-linked structure (amide-ester linkage)

and is otherwise not limited. Examples of the oxazoline group-containing resin include 2-alkyl-oxazolines, such as 2-ethyl-oxazoline, 2-isopropyl-2-oxazoline, 2-propyl-2-oxazoline, 2,4,4-trimethyl-2-oxazoline, and 2-isopropenyl-2-oxazoline. More specifically, EPOCROS WS-700 and EPOCROS WS-500 (each produced by Nippon Shokubai) and poly(2-ethyl-oxazoline) (CAS 25805-17-8) are advantageous in view of bending-resistant fixability. The oxazoline group-containing resin may be composed of a single oxazoline group-containing resin or a combination of two or more of oxazoline group-containing resins.

Preferably, the oxazoline group-containing resin has a weight average molecular weight in the range of 20,000 to 120,000, more preferably in the range of 20,000 to 80,000. Oxazoline group-containing resins having a weight average molecular weight in such a range, particularly lower than or equal to the upper limit, tend to soluble in the solvent (water) in the ink composition. The weight average molecular weight of the oxazoline group-containing resin may be determined as the polystyrene-equivalent molecular weight measured by, for example, gel permeation chromatography (GPC) using tetrahydrofuran as the solvent.

The oxazoline group-containing resin content is preferably in the range of 3% by mass to 20% by mass, more preferably 5% by mass to 10% by mass, in terms of solids relative to the total mass of the ink composition.

The carboxy group-containing resin is a resin having a carboxy group in the structural skeleton and is otherwise not limited. The carboxy group-containing resin may be selected from among the urethane resins and fluorene skeleton-including resins that will be cited later as dispersant.

The ratio MA/MB of the amount MA by mole of the oxazoline group in the total mass of the oxazoline-containing resin to the amount MB by mole of the carboxy group in the total mass of the carboxy group-containing resin is preferably in the range of 10 to 40, more preferably in the range of 15 to 30. When the MA/MB ratio is in such a range, the ink composition can exhibit a high water fastness.

The amount MA by mole of the oxazoline group in the total mass of the oxazoline group-containing resin can be calculated by using the following equation (1):

$$MA=[\text{millimoles of the oxazoline group per 1 g of oxazoline group-containing resin (on a solid basis)}]\times[\text{grams of the oxazoline group-containing resin (on a solid basis) in the ink composition}] \quad (1)$$

The amount MB by mole of the carboxy group in the total mass of the carboxy group-containing resin can be calculated by using the following equation (2):

$$MB=[\{\text{acid value of the carboxy group-containing resin/KOH neutralization acid value}\}(\text{mmol/g})]\times[\text{grams of the carboxy group-containing resin on a solid basis in the ink composition}] \quad (2)$$

The KOH neutralization acid value in equation (2) is 56.1.

Organic Amine

Preferably, the ink composition contains an organic amine. The organic amine may be selected from the organic amines cited in paragraph 0180 of JP-A-2013-87207. Preferably, the organic amine is triisopropanolamine, triethanolamine, 2-amino-2-hydroxymethyl-1,3-propanediol, 2-amino-2-methyl-1,3-propanediol, 2-amino-2-ethyl-1,3-propanediol, or 1,3,5-triazine-1,3,5(2H,4H,6H)-triethanol from the viewpoint of providing a working environment-friendly ink composition free from highly volatile solvent.

The organic amine content is preferably in the range of 0.1% by mass to 3.0% by mass relative to the total mass of the ink composition. If the organic amine has a melting point of less than 80° C., the proportion of the water-soluble symmetrical both-end alkanediol (melting point: 80° C. or more), the slightly water-soluble 1,2-alkanediol (melting point: 30° C. to less than 80° C.) and the organic amine (melting point: less than 80° C.) is preferably 6:1:1 to 12:1:1. If the organic amine is an aminoalkanediol having a melting point of 80° C. or more, the proportion of the three constituents is preferably 3:1:1 to 6:1:1 from the viewpoint of reducing the tackiness.

Surfactant

The ink composition of the present embodiment contains a surfactant. By adding a surfactant, the ink composition becomes easy to spread on the recording medium even if it is an ink-low-absorbent or non-absorbent recording medium. Thus, uneven aggregation of droplets or streaks can be reduced.

The combined use of a surfactant with the above-described slightly water-soluble 1,2-alkanediol produces a synergy to further enhance the fixability of the droplets of the ink composition and reduce uneven aggregation and streaks effectively.

Polyorganosiloxane-based surfactants including organosiloxane are advantageous as the surfactant for increasing the wettability of the ink composition on the recording medium.

Some polyorganosiloxane-based surfactants are commercially available, and examples thereof include BYK-347, BYK-348, BYK-349, BYK-3550, and BYK-UV3510 (each produced by BYK); and Olfine PD-501 and Olfine PD-570 (each produced by Nissin Chemical Industry Olfine). Preferably, the surfactant contains a polyorganosiloxane-based surfactant having a polyoxyethylene chain having a methyl group at an end.

The polyorganosiloxane-based surfactant content in the ink composition is preferably 0.1% by weight to 1.0% by weight, and more preferably 0.05% by weight to 0.50% by weight.

The ink composition may further contain any other surfactant, such as a fluorosurfactant, an acetylene glycol-based surfactant, an anionic surfactant, a nonionic surfactant, and an amphoteric surfactant.

Coloring Material

Although the coloring material may be a dye or a pigment, pigments are preferred in view of light fastness and water fastness. Preferably, the coloring material contains a pigment and a dispersant capable of dispersing the pigment in the ink and is contained in an anionic dispersion liquid.

The pigment may be an inorganic pigment or an organic pigment and may be composed of a single inorganic pigment or organic pigment or a mixture of a plurality of inorganic and/or organic pigments. Exemplary organic pigments include azo pigments, such as azo lake, insoluble azo pigments, condensed azo pigments, and chelate azo pigments; polycyclic pigments, such as phthalocyanine pigments, perylene pigments, perinone pigments, anthraquinone pigments, quinacridone pigments, dioxazine pigments, thioindigo pigments, isoindolinone pigments, and quinofuralone pigments; dye chelates, such as basic dye chelates and acid dye chelates; nitro pigments, nitroso pigments, and aniline black; and carbon blacks produced by a known process, such as a contact method, a furnace method, or a thermal method.

The pigment is selected according to the type (color) of the ink composition to be prepared. For example, pigments that can be used in a yellow ink composition include C.I. Pigment Yellows 1, 2, 3, 12, 14, 16, 17, 73, 74, 75, 83, 93, 95, 97, 98, 109, 110, 114, 128, 129, 138, 139, 147, 150, 151, 154, 155, 180, and 185. These pigments may be used singly or in combination. Preferably, at least one pigment selected from the group consisting of C.I. pigment yellows 74, 110, 128, 129, and 180 is used in the yellow ink. Pigments that can be used in a magenta ink composition include C.I. Pigment Reds 5, 7, 12, 48(Ca), 48(Mn), 57(Ca), 57:1, 112, 122, 123, 168, 184, 202, and 209, and C.I. Pigment Violet 19. These pigments may be used singly or in combination. Preferably, at least one pigment selected from the group consisting of C.I. Pigment Reds 122, 202, and 209 and C.I. Pigment Violet 19 is used in the magenta ink composition. These pigments may be in the form of solid solution. Pigments that can be used in a cyan ink composition include C.I. Pigment Blues 1, 2, 3, 15:2, 15:3, 15:4, 15:34, 16, 22, and 60, and C.I. Vat Blues 4 and 60. These pigments may be used singly or in combination. C.I. Pigment Blues 15:3 and 15:4 are preferred, and C.I. Pigment Blue 15:3 is much preferred.

Pigments that can be used in a black ink composition include carbon-based pigments, such as lampblacks (C.I. Pigment Black 6), acetylene black, furnace black (C.I. Pigment Black 7), channel black (C.I. Pigment Black 7), and carbon black (C.I. Pigment 7); inorganic pigments such as iron oxide-based pigments; and organic pigments such as aniline black (C.I. Pigment Black 1). In the present embodiment, carbon black is advantageously used. Examples of the carbon black include #2650, #2600, #2300, #2200, #1000, #980, #970, #966, #960, #950, #900, #850, MCF-88, #55, #52, #47, #45, #45L, #44, #33, #32, and #30 (each produced by Mitsubishi Chemical); Special Black series 4A and 550 and Printex series 95, 90, 85, 80, 75, 45, and 40 (each produced by Degussa); Regal 660, Rmogul L, and Monarch series 1400, 1300, 1100, 800, and 900 (each produced by Cabot); and Raven series 7000, 5750, 5250, 3500, 3500, 2500 ULTRA, 2000, 1500, 1255, 1200, 1190 ULTRA, 1170, 1100 ULTRA, and 5000 UI II (each produced by Columbian).

White pigments that can be used in a white ink composition include metal oxides, barium sulfate, and calcium carbonate. Exemplary metal oxides include titanium dioxide, zinc oxide, silica, alumina, and magnesium oxide. The white pigment may contain hollow particles, and known hollow particles may be used without particular limitation. For example, particles disclosed in U.S. Pat. No. 4,880,465 are suitable as the hollow particles.

Preferably, the particle diameter of the white pigment at 50% in the cumulative distribution on a volume basis (hereinafter referred to as average particle size) is in the range of 30 nm to 600 nm, more preferably in the range of 200 nm to 400 nm. The average particle size of the white pigment can be measured with a particle size distribution analyzer based on a laser diffraction/scattering method. For example, a particle size distribution analyzer using dynamic light scattering (for example, Microtrac UPA manufactured by Nikkiso) may be used.

The pigment content in the ink composition can be appropriately set without particular limitation and may be in the range of 1.0% by mass to 30.0% by mass on a solids content basis.

Resin Dispersant (Dispersing Resin)

Preferably, the ink composition contains at least one resin selected from the group consisting of copolymers containing a hydrophobic monomer and a hydrophilic monomer, oxyethyl acrylate-based resins, urethane-based resins, and resins having a fluorene skeleton, and more preferably contains at least one of oxyethyl acrylate-based resins and resins having a fluorene skeleton. These resins, which act as a resin dispersant (dispersing resin), can adsorb to the pigment to increase the dispersibility of the pigment.

If the resin dispersant has a carboxy group, a cross-linked structure (amide-ester linkage) is likely to be formed with the oxazoline group of the oxazoline group-containing resin. Thus, the resin dispersant having a carboxy group may significantly increases the water fastness of images formed of the ink composition.

Water and Other Constituents

The ink composition of the present embodiment used for ink jet recording contains water as the main solvent. Preferably, the water is pure water or ultrapure water, such as ion exchanged water, ultrafiltered water, reverse osmotic water, or distilled water. Preferably, the water is sterilized by irradiating with UV light or adding hydrogen peroxide. Such water prevents occurrence of mold and bacteria for a long term.

The ink composition may further contain other additives, such as a nozzle clogging inhibitor, a preservative, a fungicide, an antioxidant, an electric conductivity modifier, a pH adjuster, a viscosity modifier, a surface tension modifier, and an oxygen absorbent.

Solvent Having Melting Point of Less than 30° C.

The ink composition of the present embodiment may contain a volatile solvent having a flash point of 100° C. or less as a solvent having low odor and toxicity. Examples of such a solvent include 3-methoxy-3-methyl-1-butanol, 3-methoxy-3-methyl-1-butyl acetate, and 2-methyl-1,3-propanediol. From the viewpoint of preventing the precipitation of the symmetrical both-end alkanediol when the content thereof is 12.0% or more and thus improving the storage stability at low temperatures of 0° C. or less, 3-methoxy-3-methyl-1-butanol is preferred. It is however preferable that the ink composition do not substantially contain a solvent having a melting point of less than 30° C. More specifically, it is preferable that the ink composition do not contain 1% or more of such a solvent. If the ink composition does not contain a highly volatile solvent, the ink composition does not release odor or toxicity and thus can be environmentally friendly.

Method for Producing Ink Composition

For preparing the ink composition, first, a pigment dispersion liquid containing a pigment and a dispersant is prepared. Then, the pigment dispersion liquid, water, a surfactant, a slightly water-soluble 1,2-alkanediol having a carbon number of 7 to 10 and a melting point in the range of 30° C. to less than 80° C., and a water-soluble symmetrical both-end alkanediol having a melting point of 80° C. or more are mixed together. After the mixture is sufficiently stirred, the mixture is filtered to remove large particles and foreign matter that can cause clogging. Thus, the ink composition is obtained. In the present disclosure, it is important how the dispersion liquid is prepared.

The process for preparing the pigment dispersion liquid includes Step 1 of pretreating the pigment (sizing, washing), Step 2 of mixing and kneading, Step 3 of dispersion (reducing the particle size), and Step 4 of aftertreatment (adjusting the concentration and filtering such as ultrafiltration). For stabilizing the pigment dispersion liquid, an unstable pigment containing particles having uniform particle size and activated surfaces is prepared in Step 1. In Step 2, the pigment and a dispersing resin in a solution are mixed and kneaded to a high viscosity (solids content of about 30% or more) while the dispersing resin is absorbed and adsorbed to the pigment. In Step 3, the portions of the pigment to which the dispersing resin is adsorbed are increased while the pigment is being cleaved, and thus the pigment is dispersed in water or the main solvent (solids content: less than about 30%). In Step 4, a nonuniform portion of the dispersion is removed. The solids contents in the above parentheses are the values estimated as the content of solids made up of the pigment and the resin.

In a conventional operation for Steps 2 and 3, a polar solvent, for example an alkanediol, such as 1,2-hexanediol or 1,6-hexanediol, or a glycol ether (JP-A-2008-120977), such as triethylene glycol monobutyl ether or dipropylene glycol monomethyl ether, is used to dissolve the dispersing resin in water. Unfortunately, these solvents have melting points of less than 80° C., and therefore make tacky the recorded article printed on a film when the content of the solvent having a melting point of 80° C. or more is not higher than the content of these solvents having a melting point of less than 80° C. In the present embodiment, if the content in the pigment dispersion liquid of the solvent having a melting point of 80° C. or more is higher than the solvent having a melting point of less than 80° C., there is no limitation. It is however advantageous to use 2,5-dimethyl-2,5-hexanediol, which has a melting point of 80° C. or more, in Steps 2 and 3. Solvents having a low flash point, such as 2-methyl-1,3-propanediol (melting point: −91° C., flash point: 100° C.) evaporate at a temperature equal to the flash point. Since the temperature of the kneaded mixture is increased in Step 2, the use of a solvent composed of only solvents easy to evaporate does not allow the constituents to be uniformly kneaded.

Recording Medium

The ink composition of the present embodiment is suitably used on low-absorbent or non-absorbent recording media. The "low-absorbent or non-absorbent recording media" refer to recording media of which the water absorption measured by Bristow's method is 10 mL/m$^2$ or less for a period of 30 ms$^{1/2}$ from the beginning of contact with water. In the present embodiment, at least the surface of the recording medium has this property. The Bristow's method is broadly used as a method for measuring liquid absorption for a short time, and Japan Technical Association of the Pulp and Paper Industry (JAPAN TAPPI) has officially adopted this method. Details of this method are specified in Standard No. 51 of "JAPAN TAPPI Kami Pulp Shiken Hou 2000-nen Ban" (JAPAN TAPPI Pulp and Paper Test Methods, edited in 2000).

The ink-non-absorbent recording medium may be a plastic film not provided with an ink-absorbing layer, or a paper sheet or any other base material coated with or bonded to a plastic film. The plastic mentioned here may be polyvinyl chloride, polyethylene terephthalate, polycarbonate, polystyrene, polyurethane, polyethylene, or polypropylene.

The ink-low-absorbent recording medium may be a coated paper provided with a coating layer on the surface thereof for receiving oil-based ink, and examples thereof include art paper, coat paper, and matte paper.

Ink-non-absorbent or ink-low-absorbent recording media made of metal or glass may be used.

Ink Jet Recording Apparatus

An ink jet recording apparatus used in the ink jet recording method of an embodiment of the invention will now be described. The ink jet recording apparatus includes a head having a nozzle line defined by a plurality of nozzle openings. The ink jet recording apparatus will now be described with reference to FIGS. 1 to 2. For ease of recognition, the dimensional proportions of the members and components in the figures are changed as needed.

FIG. 1 is a block diagram of a recording system including an ink jet recording apparatus 1 connected to a computer 90.

Figure 2:
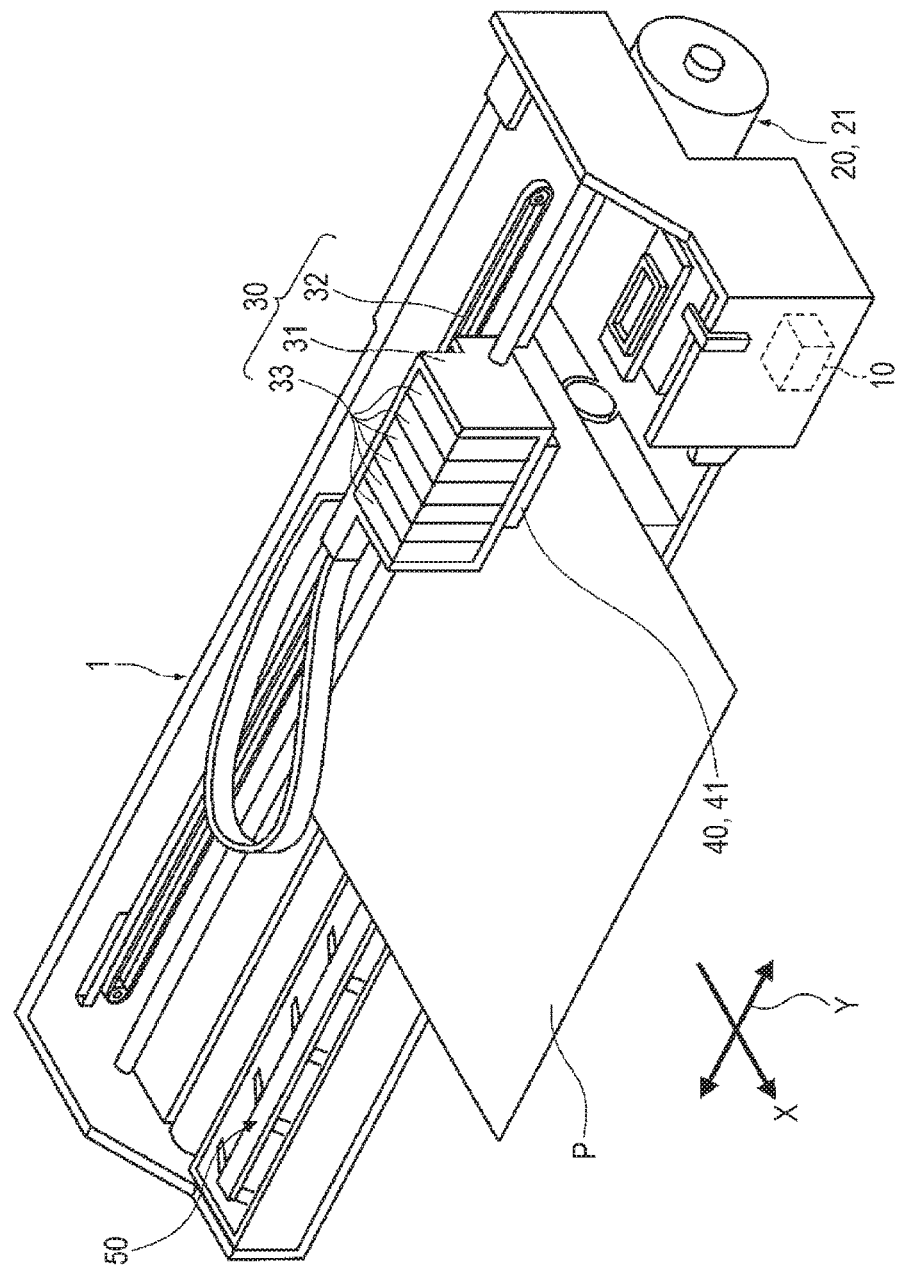
FIG. 2 is a schematic perspective view of a recording apparatus used in an embodiment of the invention.

FIG. 2 is a schematic perspective view of the ink jet recording apparatus 1.

The ink jet recording apparatus 1 is intended to record information (form a recorded article) on a recording medium P by an ink jet method. A controller 10 is a control unit configured to control the recording apparatus 1. An interface portion (I/F) 11 provides data communication between the computer 90 and the recording apparatus 1. A CPU 12 is an arithmetic processing unit configured to control the entirety of the recording apparatus 1. A memory device 13 is intended to secure a region in which the program of the CPU 12 is stored and a working region. The CPU 12 allows a unit control circuit 14 to control units. Detectors 60 monitor the interior of the ink jet recording apparatus 1. The controller 10 controls the units according to the monitoring results of the detectors.

A transport unit 20 transports the recording medium P in which the recording medium P continues (transporting direction, X direction in FIG. 2). The recording medium P on which information will be recorded is fed to the region where an ink jet coating liquid is applied by rotating a transport roller 21 with a motor.

A carriage unit 30 reciprocally moves the head 41 in the direction along the width of the recording medium (Y direction in the figure). The carriage unit 30 includes a carriage 31 on which the head 41 is mounted, a carriage moving mechanism 32 configured to reciprocally move the carriage, and ink cartridges 33.

Each ink cartridge 33 is charged with an ink composition. The ink cartridge 33 is not limited to the type to be mounted on the carriage 31 as disclosed in the present embodiment and may be a type mounted to the body side of the ink jet recording apparatus 1 and configured to supply an ink composition to the head 41 through a liquid supply tube.

A head unit 40 includes the head 41 mounted on the carriage 31. The head 41 is provided with nozzle openings in the bottom thereof, and the ink composition is ejected through the nozzle openings. The structure (arrangement of the nozzle lines) of the head 41 will be described later.

A drying unit 50 dries the ink composition applied onto the recording medium. The drying unit 50 may be a platen heater, a hot air heater, or an IR heater, each of which includes a heating mechanism. A blower not including a heating mechanism may be used.

The head 41 has a plurality of nozzle lines. Each nozzle line is defined by a plurality of nozzle openings. For example, the nozzle line is defined by a plurality of nozzle openings aligned in the transporting direction of the recording medium P.

The ink jet recording apparatus 1 is what is called a serial type. A serial ink jet recording apparatus refers to a mechanism mounted on a carriage movable in a predetermined direction and configured to eject droplets while being moved with the movement of the carriage.

Although the ink jet recording apparatus of the present embodiment is of a serial type, it is not limited to this and may be of a line type. A line ink jet recording apparatus refers to a mechanism including a head wider than the width of the recording medium so that droplets can be ejected onto the recording medium without moving the head.

In the line ink jet recording apparatus, each nozzle line is aligned in the width direction of the recording medium, and the nozzle openings defining the nozzle line are also aligned in the width direction of the recording medium.

Ink Jet Recording Method

An ink jet recording method according to an embodiment of the invention uses an ink jet recording apparatus including a head, and the method includes applying the above-described ink composition onto a recording medium through the nozzle openings, and heating the recording medium at a temperature lower than the melting point of the symmetrical both-end alkanediol in the ink composition. The ink jet recording method using the ink jet recording apparatus 1 will now be described in detail.

The ink jet recording apparatus 1 alternately repeats a moving operation (pass) of moving the carriage 31 in a direction and a transporting operation. For these operations, the controller 10 controls the carriage unit 30 so as to move the carriage 31 for each pass and also controls the head unit 40 so as to eject the ink composition through specific nozzle openings of the head 41, thus applying droplets of the ink composition onto the recording medium P. The controller 10 also controls the transport unit 20 so as to transport the recording medium P in a predetermined degree of transport in the transporting direction.

By alternately repeating the pass operation and the transporting operation, a region on which a plurality of droplets (dots) have been applied is gradually transported toward the drying unit 50. Then, the droplets on the recording medium are dried at the position opposing the drying unit 50, and thus an image is completed. Then, the completed recorded article may be wound into a roll by a winder (not shown) or transported by a flat bed mechanism (not shown).

For the step of heating the recording medium at a temperature lower than the melting point of the symmetrical both-end alkanediol in the ink composition, for example, the drying unit 50 is used. The ink composition is allowed to flow by this heating step, thus forming an image having satisfactory fixability.

The ink jet recording method may further include the step of forcibly drying the recording medium at a temperature higher than the boiling point of water in the ink jet recording apparatus, in addition to the step of heating the recording medium at a temperature lower than the melting point of the symmetrical both-end alkanediol. The forcibly drying temperature is preferably 200° C. or less in view of the heat resistance of the ink composition. Preferably, the melting point of the symmetrical both-end alkanediol is lower than the forcibly drying temperature.

If water is forcibly dried at 100° C. or more, the water is rapidly evaporated from the interface with the recording medium as well as from others, and accordingly the solids content is increased. Thus, the fluidity and the wettability on the recording medium, of the ink composition are degraded. Consequently, the resulting image is likely to exhibit poor fixability and glossiness (with blisters formed at the interface with the recording medium). It is therefore more preferable that the melting point of the symmetrical both-end alkanediol be lower than the boiling point (100° C.) of water, in view of fluidity in the drying step.

The ink jet recording method, in which the above-described ink composition is used, can form images having low tackiness at room temperature and exhibiting high fixability and water fastness.

EXAMPLES

The subject matter of the invention will be further described in detail with reference to Examples, but is not limited to the examples.
Preparation of Pigment Dispersion Liquid A pressure kneader was charged with the ingredients shown in Table 1. The ingredients were kneaded (Step 2). After 10 hours, a kneaded pigment mixture was obtained. The solids content when the ingredients were introduced into the kneader and after the ingredients were kneaded are shown in Table 2. 2,5-Dimethyl-2,5-hexanediol is solid at room temperature. Isopropyl alcohol (IPA) is not evaporated at the beginning of kneading, but is substantially completely evaporated after kneading because the temperature of the kneaded mixture is increased during kneading. Table 2 shows the solids content when only the pigment and the resin are considered to be solid without considering 2,5-dimethyl-2,5-hexanediol to be solid, and the solids content when 2,5-dimethyl-2,5-hexanediol is considered to be solid. 2,5-Dimethyl-2,5-hexanediol is hereinafter represented as DMHD in some cases.

TABLE 1

| Charging ingredients (35% by mass of solids: pigment and resin) | Oxyethyl resin (neutralized with triethylamine) | 1.0 |
|---|---|---|
| | Fluorene resin (neutralized with triethylamine) | 1.0 |
| | Pigment | 5.0 |
| | 2,5-Dimethyl-2,5-hexanediol (melting point: 90° C.) | 3.0 |
| | Isopropyl alcohol (IPA) | 4.0 |
| | Ultrapure water | 6.0 |
| Total | | 20.0 |

TABLE 2

| | When introduced into kneader (before IPA evaporation) | After kneading (after IPA evaporation) |
|---|---|---|
| Not considering 2,5-dimethyl-2,5-hexanediol to be solid | 35% | 44% |
| Considering 2,5-dimethyl-2,5-hexanediol to be solid | 50% | 63% |

The kneaded pigment mixture was introduced into an agitator, and ultrapure water was added to adjust the solids content (defined by only the pigment and the resin) to 30%. The mixture was introduced into a bead mill capable of reducing the particle size (capable of producing organic pigment fine particles of 50 nm in particle size) and subjected to three-pass treatment to yield a pigment dispersion. Then, the pigment dispersion was introduced into an agitator, and ultrapure water was added to adjust the solids content to 20%. At this time, the dispersion was agitated at 95° C. for 2 hours. After the remaining volatile substance was removed, the dispersion was centrifuged at 25000 G for 5 minutes to remove large particles. Finally, an aqueous solution of sodium hydroxide was added so that the dispersion would have a pigment solids content of 10% and a pH of 9.0. Thus a pigment dispersion liquid was prepared. Pigment dispersion liquids for comparative examples were prepared by replacing 2,5-dimethyl-2,5-hexanediol with 1,5-pentanediol or 1,6-hexanediol.

Preparation of Color Ink Compositions

Color ink compositions were each prepared by mixing the pigment dispersion liquid prepared above and the ingredients shown in Tables 3 to 5 with stirring, and then filtering the mixture through a 10 μm membrane filter. Tables 3 to 5 show the constituents and contents thereof in the color ink compositions of Examples and Comparative Examples.

TABLE 3

|  |  | Example 1 | Example 2 | Example 3 | Example 4 | Example 5 | Example 6 | Example 7 | Example 8 |
|---|---|---|---|---|---|---|---|---|---|
| Dispersion liquid (Pigment content: 10% by mass) | Oxyethyl resin | 1.0 | 1.0 | 1.0 | 1.0 | 1.0 | 1.0 | 1.0 | 1.0 |
|  | Fluorene resin | 1.0 | 1.0 | 1.0 | 1.0 | 1.0 | 1.0 | 1.0 | 1.0 |
|  | Pigment | 5.0 | 5.0 | 5.0 | 5.0 | 5.0 | 5.0 | 5.0 | 5.0 |
|  | Ultrapure water | 40.0 | 40.0 | 40.0 | 40.0 | 40.0 | 40.0 | 40.0 | 40.0 |
|  | DMHD (melting point: 90° C.) | 3.0 | 3.0 | 3.0 | 3.0 | 3.0 | 3.0 | 3.0 | 3.0 |
| DMHD (melting point: 90° C.) |  | 0.0 | 15.0 | 0.0 | 15.0 | 0.0 | 15.0 | 15.0 | 6.0 |
| 1,2-Octanediol (melting point: 36° C.) |  | 1.0 | 3.0 | 1.0 | 3.0 | 1.0 | 3.0 | 3.0 | 3.0 |
| Organosiloxane |  | 0.3 | 0.3 | 0.3 | 0.3 | 0.3 | 0.3 | 0.3 | 0.3 |
| Oxazoline resin (WS-700) |  | 0 | 0 | 6.0 | 6.0 | 6.0 | 6.0 | 6.0 | 6.0 |
| Triisopropanolamine (melting point: 45° C.) |  | 0 | 0 | 0 | 0 | 1.0 | 1.0 | 3.0 | 0 |
| 2-Amino-2-hydroxymethyl-1,3-propanediol |  | 0 | 0 | 0 | 0 | 0 | 0 | 0 | 3.0 |
| Ultrapure water |  | Balance | Balance | Balance | Balance | Balance | Balance | Balance | Balance |
| Evaluation test 1: Tackiness |  | A | A | A | A | A | A | A | AA |
| Evaluation test 2-1: Fixability |  | A | A | A | A | A | A | A | A |
| Evaluation test 2-2: Bending-resistant fixability |  | B | B | A | A | A | A | A | A |
| Evaluation test 3: Water fastness |  | A | B | A | A | A | A | A | A |
| Evaluation test 4: Storage stability |  | A | A | B | B | A | A | A | A |

TABLE 4

|  |  | Comparative Example 1 | Comparative Example 2 | Comparative Example 3 | Comparative Example 4 | Comparative Example 5 | Comparative Example 6 |
|---|---|---|---|---|---|---|---|
| Dispersion liquid (Pigment content: 10% by mass) | Oxyethyl resin | 1.0 | 1.0 | 1.0 | 1.0 | 1.0 | 1.0 |
|  | Fluorene resin | 1.0 | 1.0 | 1.0 | 1.0 | 1.0 | 1.0 |
|  | Pigment | 5.0 | 5.0 | 5.0 | 5.0 | 5.0 | 5.0 |
|  | Ultrapure water | 40.0 | 40.0 | 40.0 | 40.0 | 40.0 | 40.0 |
|  | 1,6-Hexanediol (melting point: 41° C.) | 3.0 | 3.0 | 3.0 | 3.0 | 3.0 | 3.0 |
| 1,6-Hexanediol (melting point: 41° C.) |  | 0.0 | 15.0 | 0.0 | 15.0 | 0.0 | 15.0 |
| 1,2-Octanediol (melting point: 36° C.) |  | 1.0 | 3.0 | 1.0 | 3.0 | 1.0 | 3.0 |
| Organosiloxane |  | 0.3 | 0.3 | 0.3 | 0.3 | 0.3 | 0.3 |
| Oxazoline resin (WS-700) |  | 0 | 0 | 6.0 | 6.0 | 6.0 | 6.0 |
| Triisopropanolamine (melting point: 45° C.) |  | 0 | 0 | 0 | 0 | 1.0 | 1.0 |
| Ultrapure water |  | Balance | Balance | Balance | Balance | Balance | Balance |
| Evaluation test 1: Tackiness |  | B | C | B | C | B | C |
| Evaluation test 2-1: Fixability |  | B | B | B | B | B | B |
| Evaluation test 2-2: Bending-resistant fixability |  | C | C | C | C | C | C |
| Evaluation test 3: Water fastness |  | B | C | B | C | B | C |
| Evaluation test 4: Storage stability |  | A | A | B | B | A | A |

TABLE 5

|  |  | Comparative Example 7 | Comparative Example 8 | Comparative Example 9 | Comparative Example 10 | Comparative Example 11 | Comparative Example 12 |
|---|---|---|---|---|---|---|---|
| Dispersion liquid (Pigment content: 10% by mass) | Oxyethyl resin | 1.0 | 1.0 | 1.0 | 1.0 | 1.0 | 1.0 |
|  | Fluorene resin | 1.0 | 1.0 | 1.0 | 1.0 | 1.0 | 1.0 |
|  | Pigment | 5.0 | 5.0 | 5.0 | 5.0 | 5.0 | 5.0 |
|  | Ultrapure water | 40.0 | 40.0 | 40.0 | 40.0 | 40.0 | 40.0 |
|  | 1,5-Pentanediol (melting point: −18° C.) | 3.0 | 3.0 | 3.0 | 3.0 | 3.0 | 3.0 |
| 1,5-Pentanediol (melting point: −18° C.) |  | 0.0 | 15.0 | 0.0 | 15.0 | 0.0 | 15.0 |
| 1,2-Octanediol (melting point: 36° C.) |  | 1.0 | 3.0 | 1.0 | 3.0 | 1.0 | 3.0 |
| Organosiloxane |  | 0.3 | 0.3 | 0.3 | 0.3 | 0.3 | 0.3 |
| Oxazoline resin |  | 0 | 0 | 7.2 | 7.2 | 7.2 | 7.2 |
| Triisopropanolamine |  | 0 | 0 | 0 | 0 | 1.0 | 1.0 |
| Ultrapure water |  | Balance | Balance | Balance | Balance | Balance | Balance |
| Evaluation test 1: Tackiness |  | C | C | C | C | C | C |
| Evaluation test 2: Fixability |  | B | B | B | B | B | B |

TABLE 5-continued

|  | Comparative Example 7 | Comparative Example 8 | Comparative Example 9 | Comparative Example 10 | Comparative Example 11 | Comparative Example 12 |
|---|---|---|---|---|---|---|
| Evaluation test 3: Water fastness | C | C | B | C | B | C |
| Evaluation test 4: Storage stability | A | A | B | B | A | A |

Evaluation

The ink cartridge of an ink jet printer (PX-G5100 manufactured by Seiko Epson) was charged with any one of the color ink compositions prepared according to Tables 3 to 5.

For evaluation tests 1 to 3, the average mass of droplets (hereinafter referred to as average ink mass) of the ink composition ejected through the nozzle openings of the printer was adjusted. More specifically, droplets are ejected 10 times through the nozzle openings, and the mass of the ejected ink was measured with a precision balance. The average ink mass was calculated by dividing the measured value by the total number of ejected ink droplets (product of the number of times of ejection for each nozzle and the number of nozzles). The ejection waveform of, for example, driving voltage for ejecting the ink droplets was adjusted so that the average ink mass would be 7 ng based on the calculated value.

For recording for evaluation tests 1 to 3, the resolutions (vertical resolution×horizontal resolution) were set to 360 dpi×720 dpi for each scanning (pass), and each recorded article was produced by 2 passes. The image resolution and the duty were represented by the following equations (3) and (4), respectively.

Image resolution (dpi)(vertical resolution×horizontal resolution, for each scanning)×(number of times of scanning) (3)

(In equation (3), the image resolution refers to the resolution per unit area)

The duty is defined by equation (4):

Duty (%)=(number of dots formed in practice)/(image resolution)×100 (4)

(In equation (4), the "number of dots formed in practice" refers to the number of dots actually formed per unit area.)

Preparation of Test Samples

Film

A solid pattern with a duty of 100% was formed with the above-mentioned printer on recording media, a polyethylene terephthalate sheet Lumirror S10 (manufactured by Toray), and a vinyl chloride sheet JT5829R (manufactured by MACtac). The resulting recorded articles were heated for drying on a hot plate of 80° C. for 15 minutes. Thus, test samples were prepared.

Evaluation Test 1: Tackiness

The tackiness of each sample was examined by pressing the sample with a finger, and the fingerprint on the test sample was observed. Only in the case where the sample was evaluated to be A, the drying time was changed to 3 minutes for further evaluation. The evaluation criteria were as follows, and the results are shown in Tables 3 to 5.

AA: After drying for 3 minutes, there was no tackiness and no fingerprint was formed.

A: After drying for 15 minutes, there was no tackiness and a fingerprint was formed. After drying for 3 minutes, however, a fingerprint was formed without tackiness.

B: After drying for 15 minutes, there was no tackiness, but a fingerprint was formed.

C: After drying for 15 minutes, there was tackiness and a fingerprint was formed.

Evaluation 2-1: Fixability

The sample was rubbed at a load of 500 g applied to a dry cloth (fine cotton cloth) using a Gakushin-type rubbing tester AB-301 Color Fastness Rubbing Tester (manufactured by Tester Sangyo). The fixability was examined every 10 times of rubbing. The evaluation criteria were as follows, and the results are shown in Tables 3 to 5.

A: The recorded image was not separated even after 30 times of rubbing.

B: The recorded image was not separated after 10 times of rubbing, but was separated after 20 times.

C: The recorded image was separated after 10 times of rubbing.

Evaluation 2-2: Bending-Resistant Fixability

Only the test samples using MACtac vinyl chloride sheet JT5829R, which is a flexible recording medium, were examined. After being fully folded with the printed side outward, the test sample was returned and then set in a Gakushin-type rubbing tester AB-301 Color Fastness Rubbing Tester (manufactured by Tester Sangyo). Subsequently, the bending-resistant fixability was examined every 10 times of rubbing at a load of 500 g applied to a dry cloth (fine cotton cloth). The evaluation criteria were as follows, and the results are shown in Tables 3 to 5.

A: The recorded image was not separated even after 30 times of rubbing.

B: The recorded image was not separated after 10 times of rubbing, but was separated after 20 times.

C: The recorded image was separated after 10 times of rubbing.

Evaluation 3: Water Fastness

The sample was rubbed at a load of 500 g applied to a cloth (fine cotton cloth) soaked with waster, using a Gakushin-type rubbing tester AB-301 Color Fastness Rubbing Tester (manufactured by Tester Sangyo). The water fastness was examined ever 10 rubbing operations. The evaluation criteria were as follows, and the results are shown in Tables 3 to 5.

A: The recorded image was not separated even after 30 rubbing operations.

B: The recorded image was not separated after 10 rubbing operations, but was separated after 20 rubbing operations.

C: The recorded image was separated after 10 rubbing operations.

Evaluation 4: Storage Stability

The viscosity of each of the color ink compositions prepared according to Tables 3 to 5 was measured with a vibration viscometer. Then, 30 mL of the color ink composition was added into a 50 mL threaded glass laboratory vial, and the vial closed with the cap was allowed to stand in a 60° C. thermostatic bath. After one week, the vial was removed from the thermostatic bath and further allowed to stand in an environment of 20° C. for one day. Then, the viscosity was measured again in the same manner as before standing. The results were evaluated using the following equation:

Variation in viscosity (%)={(viscosity before standing)−(viscosity after standing)}(viscosity before standing)×100

A: The variation in viscosity was less than 5%.

B: There was no problem in practice, but the variation in viscosity was in the range of 5% to less than 10%.

Evaluation Results

As shown in Tables 3 to 5, the ink compositions of Examples 1 to 8, in which the content of the solvent having a melting point of 80° C. or more was higher than the content of the solvent having a melting point in the range of 30° C. to less than 80° C., exhibited sufficiently low tackiness at room temperature and good fixability. In Comparative Examples 1 to 12, in which the content of the solvent having a melting point of 80° C. or more was not higher than the content of the solvent having a melting point in the range of 30° C. to less than 80° C., the films were inferior in low tackiness, fixability, and water fastness on the films of the Examples. Also, Examples 3 to 8, which further contained an oxazoline resin, exhibited improved water fastness.

The ink compositions of Examples 1 to 8 were superior in rapidly drying (low tackiness). This suggests that the use of any of the ink compositions of the Examples allows images to be formed by a small number of passes of ink jet recording and increases the recording speed.

The invention is not limited to the above-described embodiments and Examples, and various modifications may be made. For example, the invention includes substantially the same form as the disclosed embodiments (for example, a form including the same function and method and producing the same result, or a form having the same intent and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

What is claimed is:

1. An ink composition comprising:
    water;
    a coloring material;
    a surfactant;
    a slightly water-soluble 1,2-alkanediol having a carbon number of 7 to 10 and a melting point in the range of 30° C. to less than 80° C.;
    a water-soluble symmetrical both-end alkanediol having a melting point of 80° C. or more; and
    0.1% by mass to 3.0% by mass of an organic amine,
    wherein the symmetrical both-end alkanediol is 2,5-dimethyl-2,5-hexanediol, and a content thereof is in the range of 3.0% by mass to 18.0% by mass, and
    a melting point of the organic amine is 80° C. or more, and
    wherein the weight ratio of the symmetrical both-end alkanediol to the slightly water-soluble 1,2-alkanediol is in the range of 3:1 to 6:1.

2. The ink composition according to claim 1, wherein the slightly water-soluble 1,2-alkanediol is selected from the group consisting of 1,2-octanediol, 1,2-heptanediol, 4,4-dimethyl-1,2-pentanediol, 5-methyl-1,2-hexanediol, and 4-methyl-1,2-hexanediol, and the content thereof is in the range of 1.0% by mass to 3.0% by mass.

3. The ink composition according to claim 1, further comprising a carboxy group-containing resin having a weight average molecular weight of 20,000 or more, and an oxazoline group-containing resin having a weight average molecular weight in the range of 20,000 to 120,000.

4. The ink composition according to claim 3, wherein the ratio MA/MB of the amount MA by mole of the oxazoline group in the total mass of the oxazoline-containing resin to the amount MB by mole of the carboxy group in the total mass of the carboxy group-containing resin is in the range of 10 to 40.

5. The ink composition according to claim 1, wherein the ink composition contains 0.1% by mass to 1.0% by mass of an organosiloxane as the surfactant.

6. The ink composition according to claim 1, wherein the content of solvent having a melting point of less than 30° C. is less than 1%.

7. An ink jet recording method comprising:
    ejecting the ink composition as set forth in claim 1 through a nozzle opening onto a recording medium; and
    heating the recording medium at a temperature lower than the melting point of the symmetrical both-end alkanediol.

8. An ink jet recording method comprising:
    ejecting the ink composition as set forth in claim 2 through a nozzle opening onto a recording medium; and
    heating the recording medium at a temperature lower than the melting point of the symmetrical both-end alkanediol.

9. An ink jet recording method comprising:
    ejecting the ink composition as set forth in claim 3 through a nozzle opening onto a recording medium; and
    heating the recording medium at a temperature lower than the melting point of the symmetrical both-end alkanediol.

10. An ink jet recording method comprising:
    ejecting the ink composition as set forth in claim 4 through a nozzle opening onto a recording medium; and
    heating the recording medium at a temperature lower than the melting point of the symmetrical both-end alkanediol.

11. An ink jet recording method comprising:
    ejecting the ink composition as set forth in claim 5 through a nozzle opening onto a recording medium; and
    heating the recording medium at a temperature lower than the melting point of the symmetrical both-end alkanediol.

12. An ink jet recording method comprising:
    ejecting the ink composition as set forth in claim 6 through a nozzle opening onto a recording medium; and
    heating the recording medium at a temperature lower than the melting point of the symmetrical both-end alkanediol.

* * * * *